(12) United States Patent
Steger et al.

(10) Patent No.: US 12,438,974 B2
(45) Date of Patent: Oct. 7, 2025

(54) USER INITIATED ENTITY VERIFICATION

(71) Applicant: bank of america corporation, Charlotte, NC (US)

(72) Inventors: Kent Steger, Huntersville, NC (US); Ramakrishna Yannam, The Colony, TX (US); Tao Huang, Issaquah, WA (US); Jorge Kara, Kirkland, WA (US); Sarah M. Fatemi, Los Angeles, CA (US); Ali Salim, Redmond, WA (US); Anuradha Girish Sethuram, Frisco, TX (US); Christine Co, Renton, WA (US)

(73) Assignee: Bank of America Corporation, Charlotte, NC (US)

( * ) Notice: Subject to any disclaimer, the term of this patent is extended or adjusted under 35 U.S.C. 154(b) by 121 days.

(21) Appl. No.: 18/386,434

(22) Filed: Nov. 2, 2023

(65) Prior Publication Data
US 2025/0150445 A1 May 8, 2025

(51) Int. Cl.
*H04M 1/663* (2006.01)
*H04M 3/22* (2006.01)

(52) U.S. Cl.
CPC ......... *H04M 1/663* (2013.01); *H04M 3/2281* (2013.01)

(58) Field of Classification Search
CPC .......................... H04M 1/663; H04M 3/2281
See application file for complete search history.

(56) References Cited

U.S. PATENT DOCUMENTS

| | | | | |
|---|---|---|---|---|
| 9,621,722 | B2* | 4/2017 | Krack | H04M 3/523 |
| 9,928,839 | B1* | 3/2018 | Lester | H04L 63/0861 |
| 10,616,411 | B1* | 4/2020 | Chang | H04M 3/2281 |
| 11,348,576 | B1* | 5/2022 | Lynch | G10L 13/00 |
| 11,463,572 | B1* | 10/2022 | Smith-Rose | H04M 3/42059 |
| 2015/0052121 | A1* | 2/2015 | Sharifi | G06F 16/433 |
| | | | | 707/723 |
| 2015/0098556 | A1* | 4/2015 | Mathur | H04M 1/271 |
| | | | | 379/88.02 |
| 2016/0105425 | A1* | 4/2016 | Clausen | G06Q 50/265 |
| | | | | 726/6 |
| 2020/0162253 | A1* | 5/2020 | Daly | H04L 63/18 |
| 2020/0322483 | A1* | 10/2020 | Anand | H04M 15/47 |
| 2022/0086139 | A1* | 3/2022 | Venkatesh | H04L 63/0861 |
| 2022/0294890 | A1* | 9/2022 | Birch | H04M 3/436 |

* cited by examiner

*Primary Examiner* — Boris D Grijalva Lobos
(74) *Attorney, Agent, or Firm* — Weiss & Arons LLP

(57) ABSTRACT

Methods, apparatus, and systems for detection and remediation of an identified attempt of impersonation of a digital entity. The methods may include authenticating a call received by a user device. The methods may include instantiating an entity-operated application on the user device. The methods may include detecting one or more keywords indicating that the call is associated with a predefined entity. The methods may include generating and transmitting a one-time token to the predefined entity. The methods may include identifying, during the call, a first voice and a second voice, the second voice being different from the first voice. The methods may include processing words identified as being uttered by the second voice into groups of text utterances using a natural language processing ("NLP") model. The methods may include detecting, during a predetermined time period, if any text utterances from the groups of text utterances correspond to the one-time token.

18 Claims, 9 Drawing Sheets

USER INITIATED ENTITY VERIFICATION

FIELD OF TECHNOLOGY

The field of technology relates to impersonation detection.

BACKGROUND OF THE DISCLOSURE

Users may receive phone calls from different callers. At times, callers may claim to be associated with a specific entity. Callers may request personal and confidential information from the user. Users may not know if the caller is associated with the specific entity or if the caller is impersonating the specific entity. Users may inadvertently assume that the caller is legitimate and provide confidential information to the impersonator.

As such, it may be desirable to provide a system for a user to verify if a caller is associated with the specific entity. It may be further desirable to provide a system that can verify the call without input from the user.

SUMMARY OF THE DISCLOSURE

Systems, apparatus and methods for detection and remediation of an identified attempt of impersonation of a digital entity are provided. The methods may include executing an authentication module on a mobile user device. The mobile user device may be a cellular phone, smartphone, personal digital assistant ("PDA"), satellite phone, or any other suitable mobile device. The mobile user device may include a transceiver. The transceiver may be configured to transmit and receive calls at the mobile user device.

The authentication module may monitor calls received and transmitted by the mobile user device. The authentication module may be a software program. The authentication module may be instantiated on the mobile user device. The authentication module may be instantiated without input from a user of the mobile user device. The authentication module may include a voice-detection algorithm.

The voice-detection algorithm may include one or more deep learning algorithms. Deep learning algorithms may utilize neural networks. Neural networks may use interconnected nodes or neurons in a layered structure to analyze data and predict outcomes. The voice-detection algorithm may include a natural language processing ("NLP") model. The NLP model may enable the voice-detection algorithm to recognize, analyze, interpret and understand written and/or spoken human language.

The methods may include receiving a call at the mobile user device. The call may be received from a caller. The caller may self-identify as being associated with a predefined entity. The methods may include authenticating, using the authentication module, that the call originates from the predefined entity. The authenticating may include instantiating an instance of an entity-operated web-based application on the mobile user device.

The entity-operated web-based application may be a software application. The entity-operated web-based application may be installed on the mobile user device. The entity-operated web-based application may include a first connection. The first connection may connect the entity-operated web-based application to a plurality of entity networks. The entity-operated web-based application may include a second connection. The second connection may connect the entity-operated web-based application to the mobile user device. The entity-operated application may enable a user to execute entity related actions. For example, the entity may be an e-commerce institution. As such, the entity-operated web-based application may enable a user to browse different items, select desired items, pay for desired items, return undesired items, and/or perform any other suitable e-commerce related actions.

The authenticating of the call may include detecting one or more keywords included in the call. The detection may include using the voice-detection algorithm to identify the one or more keywords. The one or more keywords may indicate that the call is associated with the predefined entity. For example, if the entity is an e-commerce institution, one or more keywords may include: order, return, shop, order history, account username, item identification numbers and any other suitable e-commerce related keywords.

The authentication of the call may include generating a one-time token. The one-time token may be generated by the entity-operated web-based application. The one time-token may be generated in response to detecting keywords relating to the predefined entity. The one-time token may be valid for a duration of the call. The one-time token may be valid for less than a duration of the call. The one-time token may be valid for any suitable amount of time. The entity-operated web-based application may transmit the one-time token to a database associated with the predefined entity. The entity-operated web-based application may transmit the one-time token to a database associated with the predefined entity via the first connection.

The authentication may include verifying the call. The verifying may be initiated through the authentication module. The verifying may include identifying, during the call, a first voice. The first voice may be from a first voice input channel of the mobile user device. The first voice may be a voice corresponding to a user of the mobile user device. The authentication module may store a voice-recognition identifier of the user's voice at a memory location associated with the mobile user device. The voice-recognition identifier may include a plurality of samples of the user's voice. The authentication module may compare the first voice from the first voice input channel to the stored voice-recognition identifier. The authentication module may compare the first voice from the first voice input channel to the stored voice-recognition identifier using an artificial intelligence ("AI") model.

The AI model may include machine learning algorithms. Machine learning algorithms may enable the AI model to learn from experience without specific instructional programming. The AI model may also include an NLP model. The AI model may use the NLP model to match the first voice to the stored voice-recognition identifier.

The verifying may include identifying during the call, a second voice. The second voice may be from a second voice input channel on the mobile user device. The second voice input channel may be different from the first voice input channel. The authentication module may use the AI model to distinguish the first voice from the second voice. The voice that is not identified as the first voice, may be identified as the second voice. The second voice may correspond to an initiator of the call.

The verifying may include processing words identified as being uttered from the second voice. The words uttered by the second voice may be processed using the NLP model. The words uttered by the second voice may be processed into groups of text utterances using the NLP model.

The verifying may include detecting, during a predetermined time period starting immediately after the generation of the one-time token, whether any text utterances from the groups of text utterances correspond to the one-time token. The detection may include using the AI model to determine if any text utterances correspond to the one-time token. The predetermined time period may be determined by the user. The predetermined time period may be determined by the authentication module. The predetermined time period may be 30 seconds, one minute, or any suitable time period.

The methods may include verifying the call as originating from the predefined entity. The call may be verified as originating from the predefined entity in response to a detection of an utterance corresponding to the one-time token from the groups of text utterances during the predetermined time period. The methods may further include in response to verifying the call, enabling the call to continue. The methods may further include identifying a phone number corresponding to a call-initiating device associated with the caller. The phone number may be a ten-digit numeric identifier. The phone number may include any suitable number of digits. The methods may include tagging the phone number as a verified phone number. The methods may include storing the verified phone number at a memory location associated with mobile user device.

The methods may include flagging the call as not originating from the predefined entity. The call may be flagged in response to a failure to detect an utterance corresponding to the one-time token from the groups of text utterances processed during the predetermined time period. The methods may include terminating the call in response to the flagging of the call. The methods may further include identifying a phone number corresponding to the call-initiating device associated with the caller. The methods may include tagging the phone number as an unverified phone number. The methods may include storing the unverified phone number at a memory location associated with mobile user device.

In other embodiments the mobile user device may be a first user device. The methods may include authenticating that the call originates from a predefined entity on a second user device. The entity-operated web-based application may be instantiated on the second user device. The second user device may be a computing device. The second user device may be a laptop, desktop, smartphone, PDA, tablet, mainframe computer, or any other suitable computing devices.

The methods may include initiating an electronic connection between the first and second user devices. The electronic connection may be initiated in response to receiving user credentials at the entity-operated web-based application. The electronic connection may be a wireless connection. The electronic connection may be a wireless connection such as Bluetooth®, Wi-Fi®, Zigbee® or any other suitable wireless protocol. The electronic connection may be a wired connection. The wired connection may include a connector. The wired connection may include wired connections such as a coaxial cable, a fiber optic cable, an ethernet cable, or any other suitable wired connector. The electronic connection may enable the second user device to monitor the first user device.

The second user device may execute the authentication module. The second user device may monitor the call occurring on the first user device, using the authentication module.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which.

DETAILED DESCRIPTION OF THE DISCLOSURE

Figure 1:
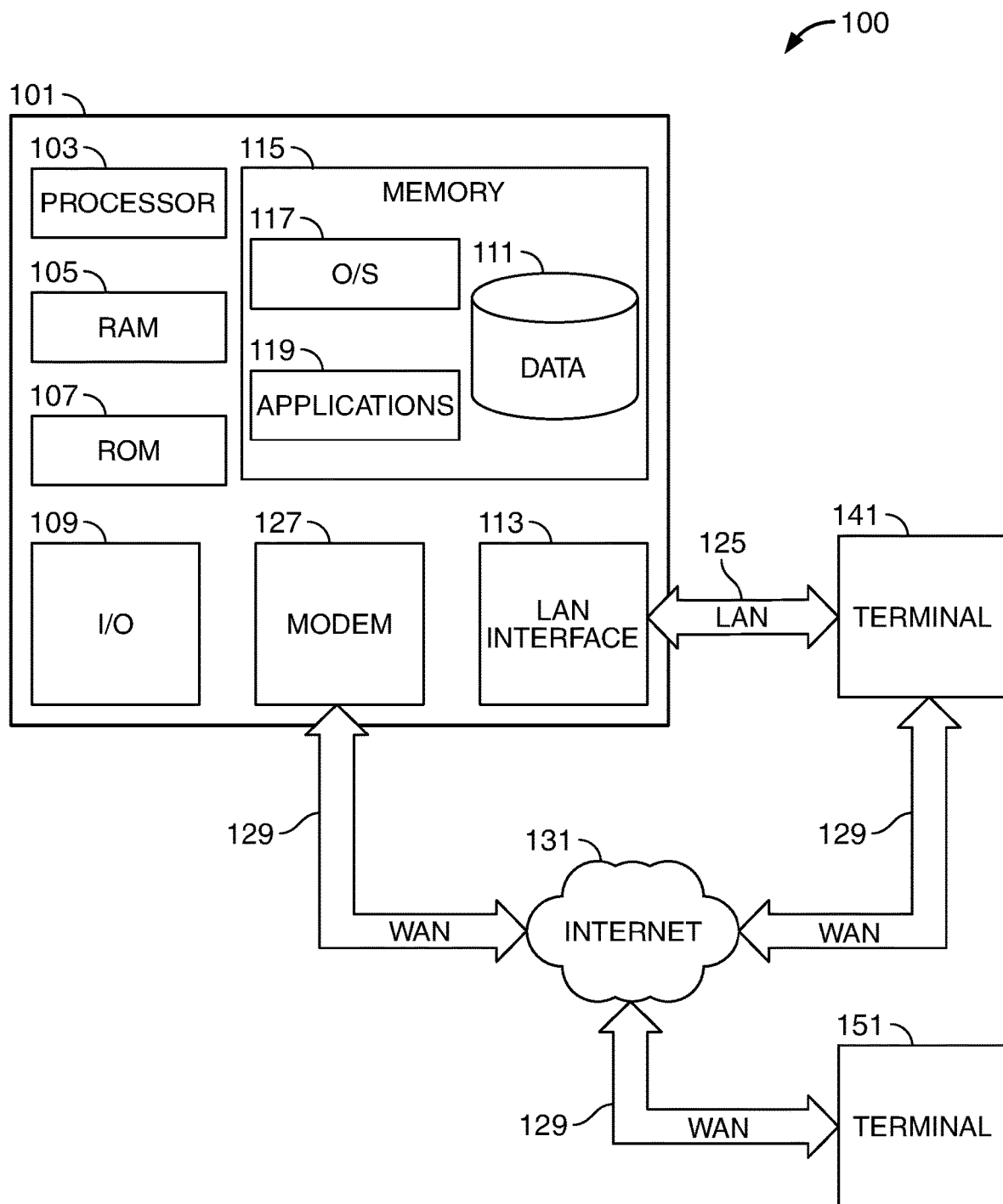
FIG. 1 shows an illustrative diagram in accordance with principles of the disclosure.

Apparatus, methods and systems for detection and remediation of an identified attempt of impersonation of a digital entity are provided. The apparatus may include a user telephone. The user telephone may be a landline phone, a cellular phone, a satellite phone or any other suitable telephone. The user telephone may include a transceiver. The transceiver may receive telephone calls. The transceiver may transmit telephone calls.

The apparatus may include a user device. The user device may be a computing device. The user device may be a desktop, laptop, smartphone, tablet, personal digital assistant ("PDA"), mainframe computer or any other suitable computing devices. The user device may include a processor. The processor may include hardware. The processor may include software. The processor may execute one or more applications.

The one or more applications executing on the user device may include an entity-operated web-based application. The entity-operated web-based application may be a software application. The entity-operated web-based application may be associated with a specific entity. The entity-operated web-based application may include a first connection. The first connection may connect the entity-operated web-based application to a plurality of entity networks. The entity-operated web-based application may include a second connection. The second connection may connect the entity-operated web-based application to the user device. The first and second connections may be back-end connections. The first and second connections may be hardware connections. The first and second connections may be software connections.

The entity-operated web-based application may be executable on the user device. The entity-operated web-based application may be executable in response to an initiation by a user. The user may receive an incoming telephone call. An operator of the incoming call may identify as being associated with the specific entity. In response to receiving the call, the user may initiate the entity-operated web-based application on the user device. The entity-operated web-based application may enable authentication of the telephone call received by the user telephone.

The entity-operated web-based application may generate a one-time token in response to receiving a user command.

The user command may include a clicking a predefined button in the entity-operated web-based application, entering a predefined combination in the entity-operated web-based application, accessing a link in the entity-operated web-based application, or any other suitable user commands. The one-time token may be a randomly generated series of alphanumeric and/or other characters. The one-time token may be user-readable token. The one-time token may be a machine-readable token. The one-time token may be valid for a duration of the call. The one-time token may be valid for less than a duration of the call. The one-time token may be valid for any suitable amount of time.

The entity-operated web-based application may transmit the one-time token to the entity. The entity-operated web-based application may transmit the one-time token to the entity through the first connection. Simultaneous to the transmission of the one-time token from the entity-operated application to the entity, the entity-operated web-based application may display the one-time token on the user device. The entity-operated web-based application may display the one-time token via the second connection.

The entity-operated web-based application may start a predetermined time period, from the transmission of the one-time token, for the telephone call to be authenticatable as originating from the entity. The time period may be 30 seconds, one minute or any other suitable time period.

The telephone call may include a corresponding phone number. The corresponding phone number may be a number associated with a telephone operated by the operator. The phone number may identify the origin of the telephone call. The phone number may be a ten-digit numeric combination. The phone number may be any suitable number of digits.

The entity-operated application may receive a verification indication from the user. The verification indication may be transmitted in response to a verification of the one-time token from the operator of the call. The operator may verify the one-time token verbally. The operator may verify the one-time token electronically. The operator may verify the one-time token in any suitable manner. The verification indication may only be transmitted when the operator verifies the one-time token within the predetermined time period. The entity-operated web-based application may transmit an alert indication to the user device and/or user telephone that the telephone call is verified in response to receiving a verification indication.

In response to receiving an alert indication the call is verified, the user device may tag the phone number corresponding to the telephone of the operator as a verified phone number. The user device may transmit the tagged phone number to a memory location associated with the user telephone and/or user device.

The entity-operated web-based application may fail to receive a verification indication from the user within the predetermined time period. In response to failing to receive the verification indication, the entity-operated web-based application may transmit an alert indication to the user device and/or user telephone that the telephone call is unsecure.

In response to receiving an alert indication the call is unsecure, the user device may tag the phone number corresponding to the telephone of the operator as an unsecure phone number. The user device may transmit the tagged phone number to a memory location associated with the user telephone and/or user device.

In the event that the entity-operated web-based application cannot identify an operator associated with the entity communicating with the user, the entity-operated web-based application may transmit a high-level alert to the user that the operator operating the telephone call is malicious.

In response to receiving an high-level alert that the call is malicious, the user device may tag the phone number corresponding to the telephone of the operator as a malicious phone number. The user device may transmit the tagged phone number to a memory location associated with the user telephone and/or user device.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smart phone, or any other suitable computing device. Elements of system 100, including computer 101, may be used to implement various aspects of the systems and methods disclosed herein. Each of the user telephones, mobile devices, user devices, databases and any other part of the disclosure may include some or all of apparatus included in system 100.

Computer 101 may have a processor 103 for controlling the operation of the device and its associated components and may include Random Access Memory ("RAM") 105, Read Only Memory ("ROM") 107, input/output circuit 109 and a non-transitory or non-volatile memory 115. Machine-readable memory may be configured to store information in machine-readable data structures. The processor 103 may also execute all software executing on the computer—e.g., the operating system and/or voice recognition software. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application(s) 119 along with any data 111 needed for the operation of the system 100. Memory 115 may also store videos, text and/or audio assistance files. nodes, servers, computing devices, User telephones, user devices, databases and any other suitable computing devices as disclosed herein may have one or more features in common with Memory 115. The data stored in Memory 115 may also be stored in cache memory, or any other suitable memory.

Input/output ("I/O") module 109 may include connectivity to a microphone, keyboard, touch screen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

System 100 may be connected to other systems via a local area network ("LAN") interface 113. System 100 may operate in a networked environment supporting connections to one or more remote computers, such as terminals 141 and 151. Terminals 141 and 151 may be personal computers or servers that include many or all of the elements described above relative to system 100. When used in a LAN networking environment, computer 101 is connected to LAN 125 through a LAN interface or adapter 113. When used in a Wide Area Network ("WAN") networking environment, computer 101 may include a modem 127 or other means for establishing communications over WAN 129, such as Internet 131. Connections between System 100 and Terminals 151 and/or 141 may be used for the communication between different nodes and systems within the disclosure.

It will be appreciated if the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be configured to store the data in cache memory, the hard drive, secondary memory, or any other suitable memory.

Additionally, application program(s) 119, which may be used by computer 101, may include computer executable instructions for invoking functionality related to communication, such as e-mail, Short Message Service ("SMS") and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may utilize one or more decisioning processes.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage and process data (e.g., "cloud computing" and/or "fog computing").

Any information described above in connection with data 111 and any other suitable information, may be stored in memory 115. One or more of applications 119 may include one or more algorithms that may be used to implement features of the disclosure comprising the transmission, storage, and transmitting of data and/or any other tasks described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, tablet, smartphone, or any other computing system for receiving, storing, transmitting and/or displaying relevant information. Terminal 151 and/or terminal 141 may be one or more data sources or a calling source. Terminals 151 and 141 may have one or more features in common with apparatus 101. Terminals 115 and 141 may be identical to system 100 or different. The differences may be related to hardware components and/or software components.

The invention may be operational with numerous other general purpose or special purpose computing system environments or configurations. Examples of well-known computing systems, environments and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices and the like.

Figure 2:
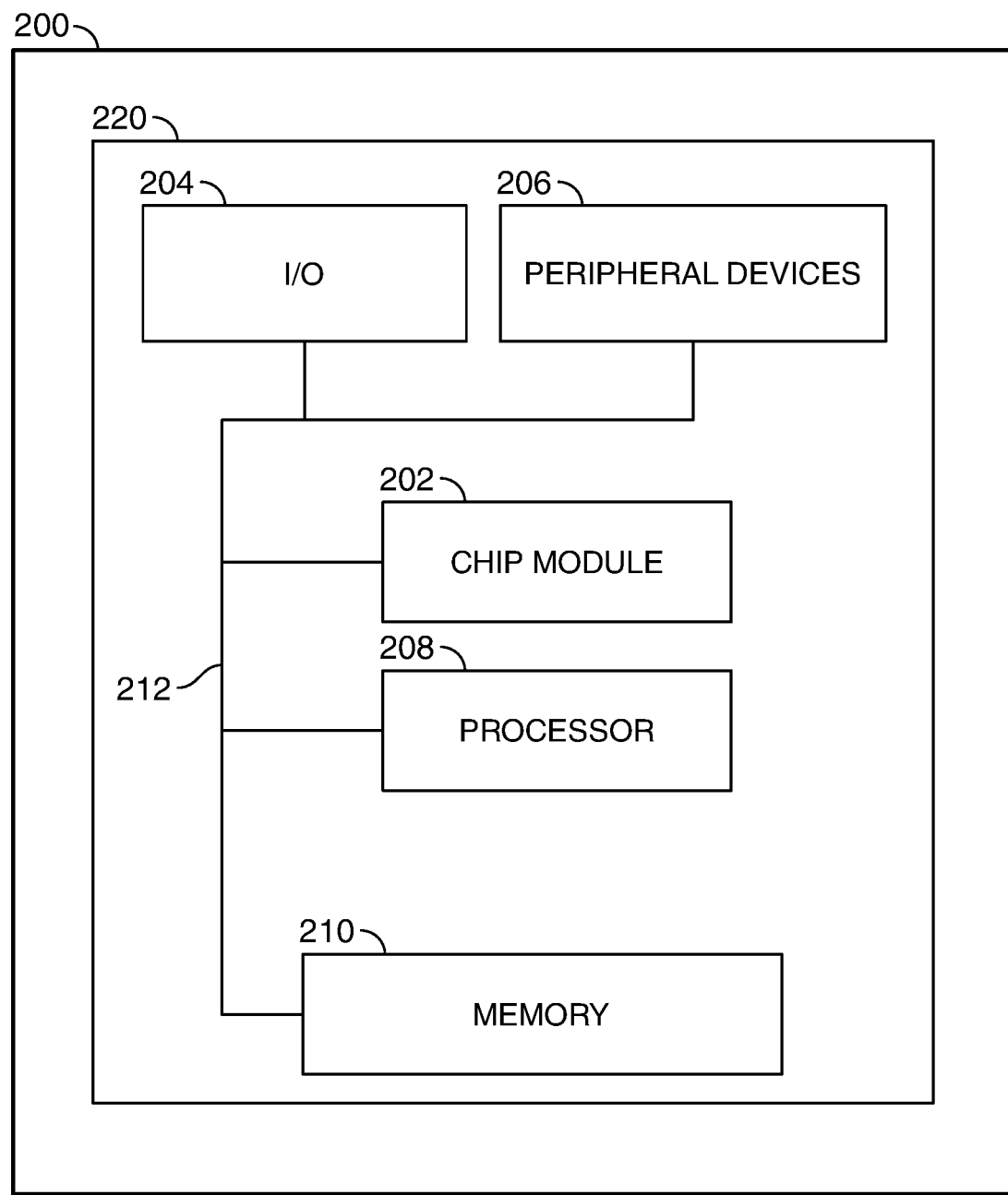
FIG. 2 shows another illustrative diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
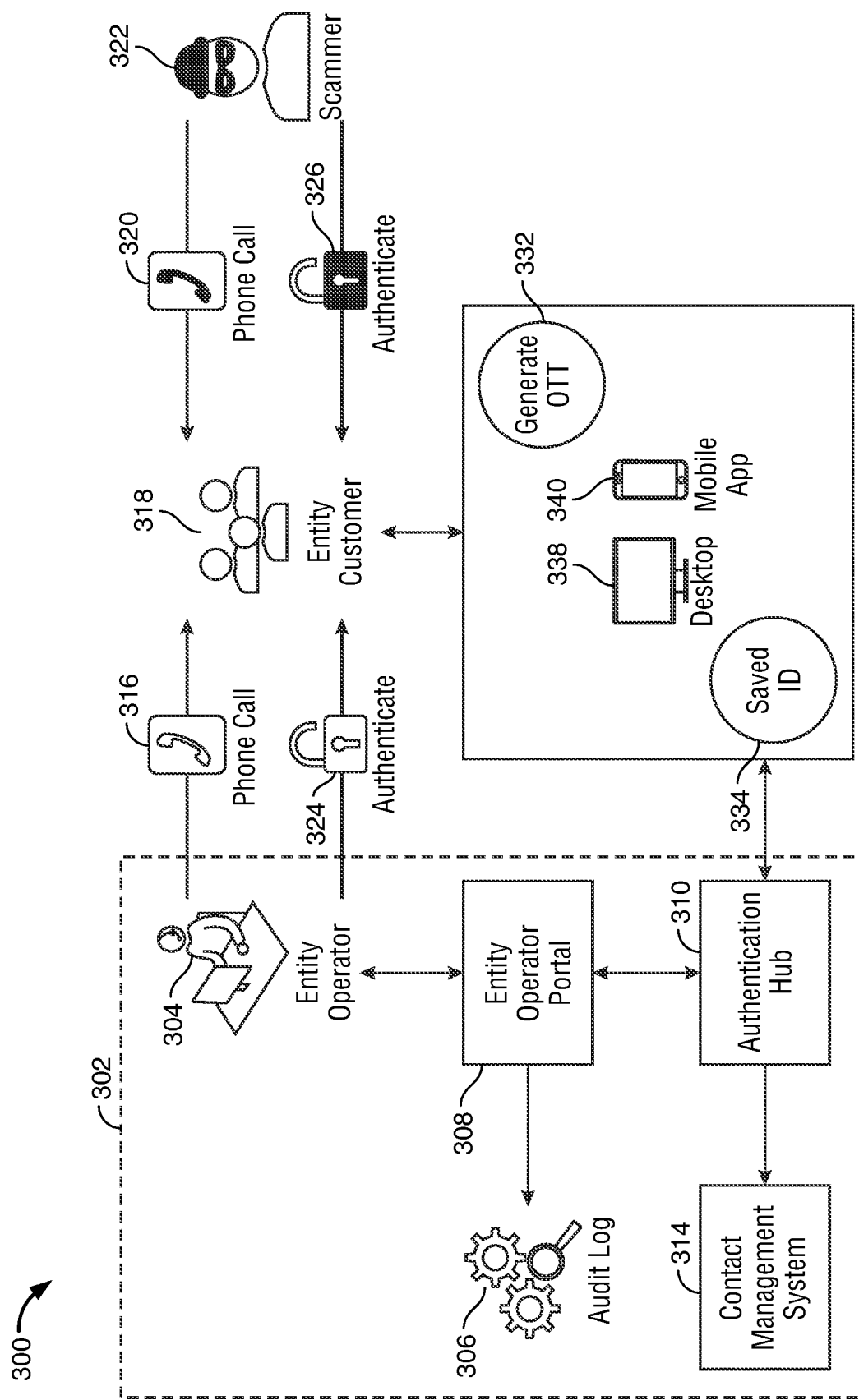
FIG. 3 shows yet another illustrative diagram in accordance with principles of the disclosure.

FIG. 3 shows illustrative process 300. Process 300 may include entity 302. Entity 302 may include operator 304. Operator 304 may communicate with entity customer 318 via telephone call 316. Entity customers may also receive call 320. Call 320 may originate from scammer 322. Scammer 322 may identify as originating from entity 302. Entity customer 318 may not know which one of call 316 or call 320 are actually associated with entity 302.

In response to receiving either of call 316 or call 320, entity customer 318 may connect to mobile app 340 or desktop 338. Entity customer 318 may generate one-time token 332 though an entity website on desktop 338, using saved identification 334. Entity customer 318 may generate one-time token 332 through mobile app 340, using saved identification 334.

One-time token 332 may be transmitted to authentication hub 310. Authentication hub 310 may be included in entity 302. In response to receiving either call 316 or call 320, entity customer 318 may request verification of one-time token 332.

When the call is call 316, entity operator 304 may query one-time token 332 associated with a phone number associated with entity customer 318 through entity operator portal 308. Entity operator portal 308 may query one-time token 332 through authentication hub 310. The query may be stored in audit log 306. Authentication hub 310 may query the phone number associated with entity customer 318 from contact management system 314. Contact management system 314 may return the phone number along with associated one-time token 332. When the call is call 316, entity operator 304 may verbally confirm one-time token 332 in response to retrieving it form contact management system 314. In response to receiving verbal verification 324 of one-time token 332, phone call 316 may be identified as originating from entity 302.

When the call is call 320, scammer 322 may provide verbal authentication 326 of one-time token 332. Verbal authentication 326 may not correspond to one-time token 332. In response to receiving verbal authentication 326, phone call 320 may be identified as originating from scammer 322. In response to identifying phone call 320 as originating form a scammer, phone call 320 may be terminated.

Figure 4:
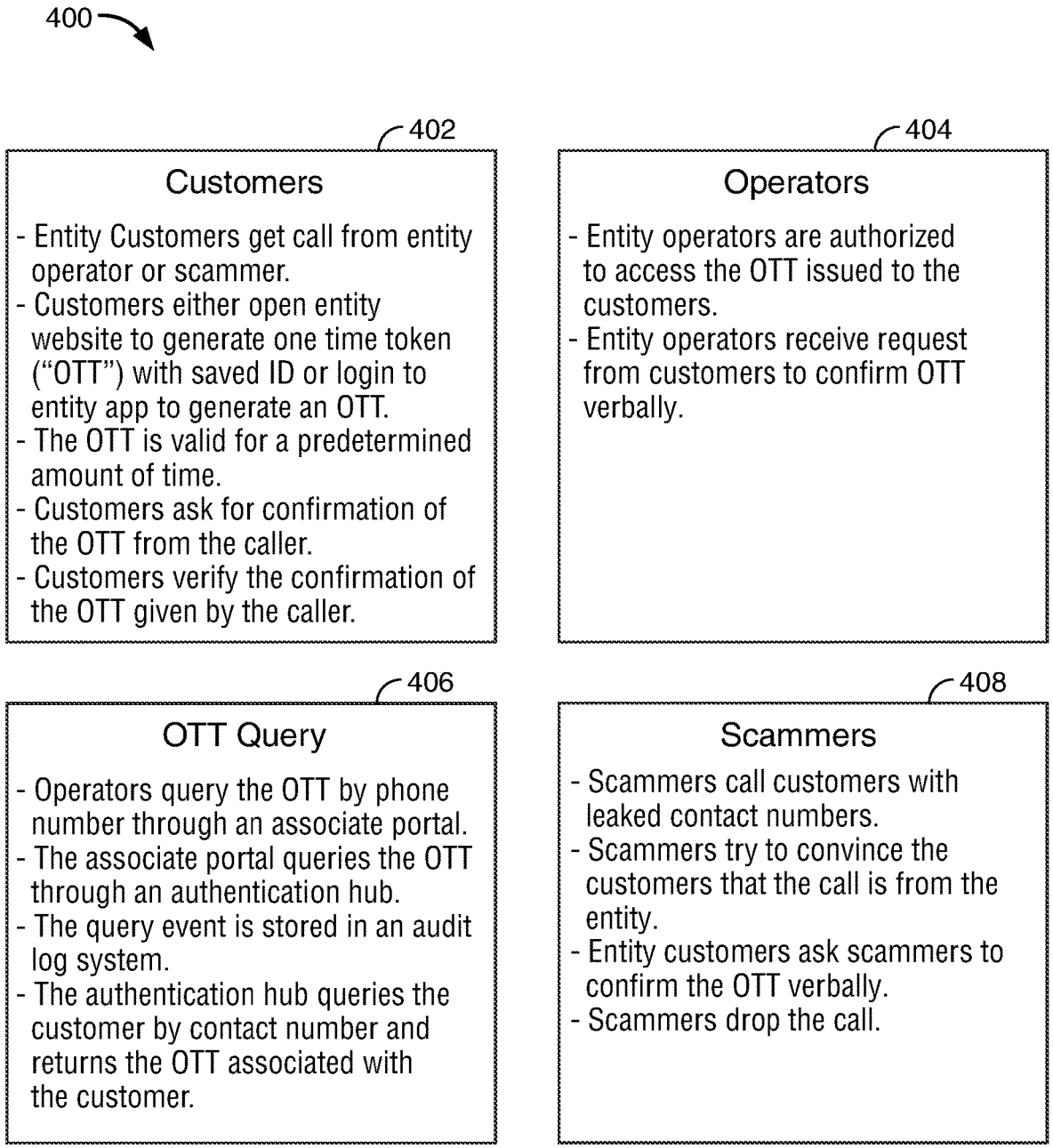
FIG. 4 shows yet another illustrative diagram in accordance with principles of the disclosure.

FIG. 4 shows illustrative process 400. Process 400 may include one or more features in common with process 300. Customers 402 may get a call from either the entity or a scammer, such as entity 304 and scammer 322. Customers 402 may either open entity website through desktop 338 or the entity application through mobile app 340 with saved identification 334 and generate one-time token 332. One-time token 332 may only be valid for a predetermined amount of time. Customers 402 may ask for verification of one-time token 332 from the caller. Customers 402 may verify the confirmation of one-time token 332 received by the caller.

Operators 404 may be authorized to access one-time token 332 issued by the entity website or application. Operators 404 may receive a request from customer 402 to verbally confirm one-time token 332. Operators 404 may initiate one-time token query 406 to confirm one-time token 332. Operators 404 may query one-time token 332 through operator portal 308. Operator portal 308 may query one-time token 332 through authentication hub 310. The query may be stored at audit log system 306. Authentication hub 310 may query the customer's contact number and return one-time token 332 associated with customer 402's contact number.

Scammers 408 may call customer 402 using leaked contact numbers. Scammers 408 may try to convince customer 402 that the call originates from the entity. Customer 402 may request verification of one-time token 332 from scammers 408. Scammers 408 may drop the call, in response to request of verification of one-time token 332.

FIGS. 5-9 shows illustrative embodiments of processes 300 and 400. Illustrative processes, methods, steps, and apparatus may be combined. For example, an illustrative process may include steps shown in connection with another illustrative process.

Figure 5:
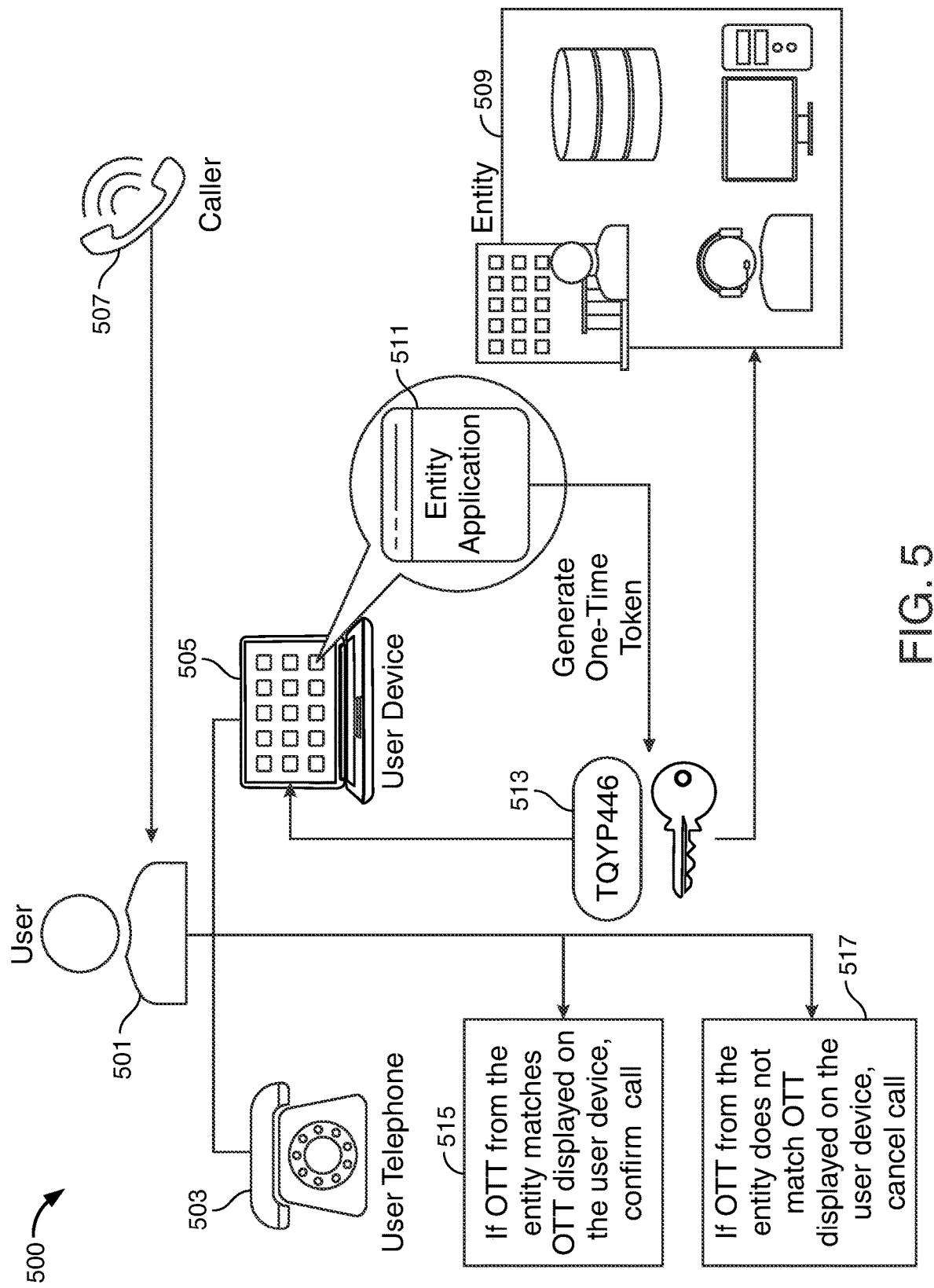
FIG. 5 shows yet another illustrative diagram in accordance with principles of the disclosure.

FIG. 5 shows illustrative process 500. Process 500 may include user 501. User 501 may be an individual user. User 501 may be a group of users. User 501 may operate user telephone 503. User telephone 503 may be a landline phone, a cellular phone, a satellite phone or any other suitable telephone. User 501 may operate user device 505. User device 505 may be a desktop, laptop, smartphone, tablet. PDA, mainframe computer or any other suitable computing device.

User 501 may receive a call from caller 507 at user telephone 503. Caller 507 may identify as originating from entity 509. Caller 507 may request confidential information from user 501. In response to the request of confidential information from caller 507, user 501 may instantiate entity application 511 on user device 505. Entity application 511 may be an application being operated by entity 509. Entity application 511 may include a first connection. The first connection may connect entity application 511 to entity 509. Entity application 511 may include a second connection. The second connection may connect entity application 511 to user device 505.

Entity application 511 may include an authentication button. The authentication button may include a link. In response to an activation of the authentication button, entity application 511 may use the link to generate one-time token 513. One time token 513 may have one or more features in common with one-time token 332. One-time token 513 may include a sequence of randomly generated alphanumeric symbols and/or characters. For example, the sequence in one-time token 513 may be "TQYP446." Entity application 511 may transmit one-time token 513 to entity 509 via the first connection. Concurrent to the transmission of one-time token 513, entity application 511 may display one-time token 513 on user device 505.

User 501 may request verification of one-time token 513 from caller 507. At step 515, user 501 may check a verification of one-time token 513 from caller 507 against one-time token 513 displayed on user device 505. In response to a verification that one-time token 513 corresponds to one-time token 513 displayed on user device 505, user 501 may confirm that caller 507 is associated with entity 509.

At step 517, user 501 may check a verification of one-time token 513 from caller 507 against one-time token 513 displayed on user device 505. In response to a failure of the verification of one-time token 513 to correspond to one-time token 513 displayed on user device 505, user 501 may cancel the call.

Figure 6:
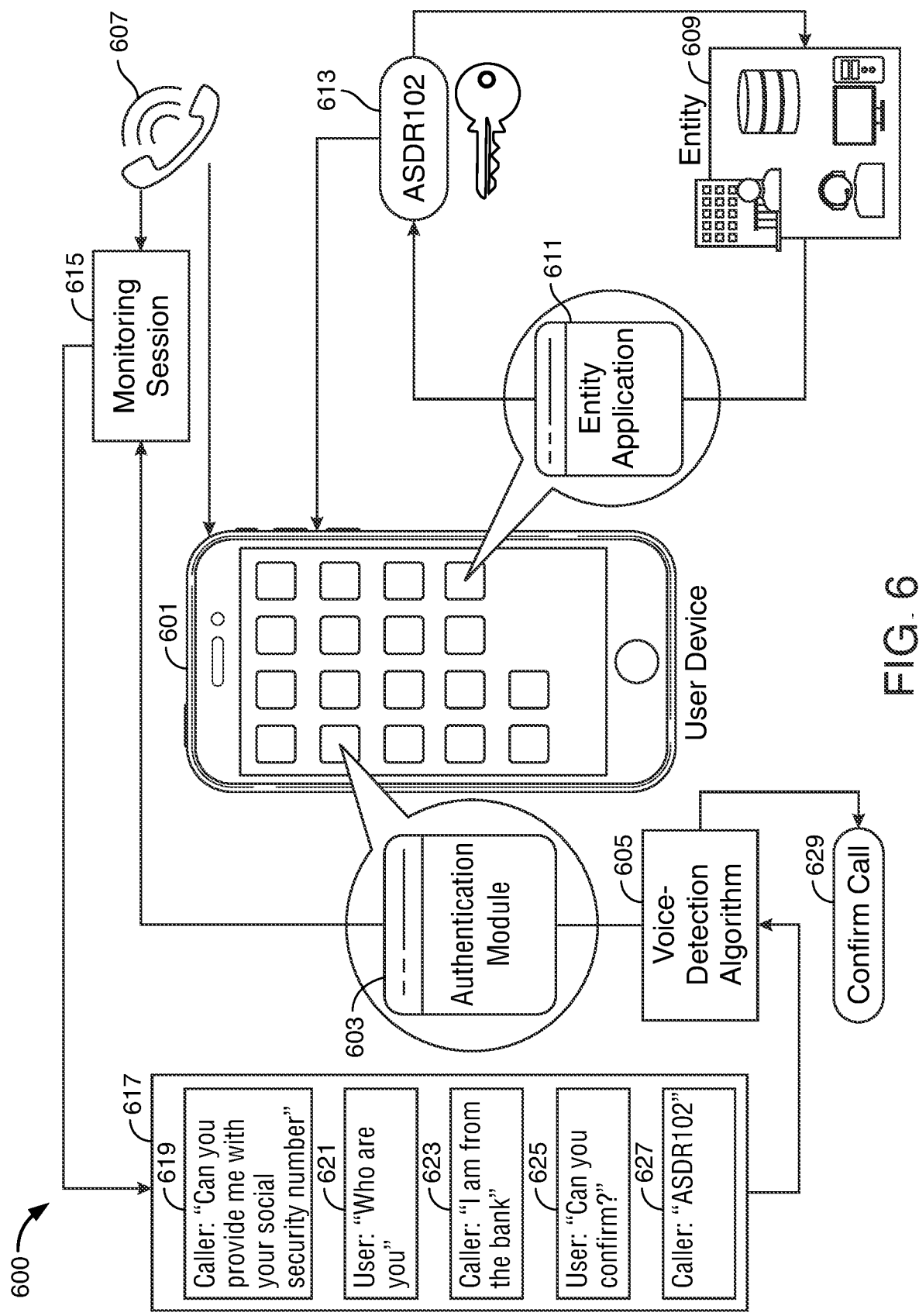
FIG. 6 shows yet another illustrative diagram in accordance with principles of the disclosure.

FIG. 6 shows illustrative process 600. Process 600 may include mobile user device 601. Mobile user device 601 may include a cellular phone, smartphone, personal digital assistant ("PDA"), satellite phone, or any other suitable mobile device. Mobile user device 601 may execute authentication module 603. Authentication module 603 may include voice-detection algorithm 605. Authentication module 603 may monitor calls being transmitted from and received by mobile user device 601. Authentication module 603 may monitor calls being transmitted from and received by mobile user device 601 using voice-detection algorithm 605.

Mobile user device 601 may receive a call from caller 607. In response to receiving a call from caller 607, voice-detection algorithm 605 may monitor the call. Voice-detection algorithm 605 may identify keywords within the call (not shown). Voice-detection algorithm 605 may identify keywords within the call indicating that caller 607 is claiming to be associated with entity 609. In response to identifying keywords relating to entity 609 in the call, entity application 611 may be instantiated on mobile user device 601.

Entity application 611 may be an application being operated by entity 609. Entity application 611 may include a first connection. The first connection may connect entity application 611 to entity 609. Entity application 611 may include a second connection. The second connection may connect entity application 611 to user device 601.

In response to an instantiation of entity application 611, entity application 611 may generate one-time token 613. One-time token 613 may include one or more of the features as described above relating to one-time token 332 and 513. Entity application 611 may transmit one-time token 613 to entity 609 via the first connection. Concurrent to the transmission of one-time token 613, entity application 611 may display one-time token 613 on mobile user device 601.

In response to transmitting and displaying of one-time token 613, authentication module 603 may instantiate monitoring session 615. Monitoring session 615 may monitor conversation 617 included in the call between a user of mobile user device 601 and caller 607. Conversation 617 may include conversation parts 619, 621, 623, 625 and 627. The user may have a first voice. The first voice may be transmitted through a first voice input channel included in mobile user device 601. Caller 607 may have a second voice. The second voice may be different from the first voice. The second voice may be received from a second input voice channel included in mobile user device 601. Voice-detection algorithm 605 may detect the first voice belonging to the user and the second voice belonging to caller 607.

Voice-detection algorithm 605 may classify conversation parts 621 and 625 as being uttered by the user. Voice-detection algorithm 605 may classify conversation parts 621 and 625 as being uttered by the user in response to an identification of the first voice belonging to the user. Voice-detection algorithm 605 may classify conversation parts 619, 623 and 627 as being uttered from caller 607. Voice-detection algorithm 605 may classify conversation parts 619, 623 and 627 as being uttered from caller 607 in response to an identification of the second voice belonging to caller 607.

Voice-detection algorithm 605 may include natural language processing ("NLP") model (not shown). The NLP model may parse conversation 617 into groups of text utterances. The NLP model may compare the text utterances to one-time token 613. In response to identifying correspondence between conversation part 627 and one-time token 613 within a predetermined time period, authentication module 603 may transmit confirm call notification 629 to mobile user device 601.

Figure 7:
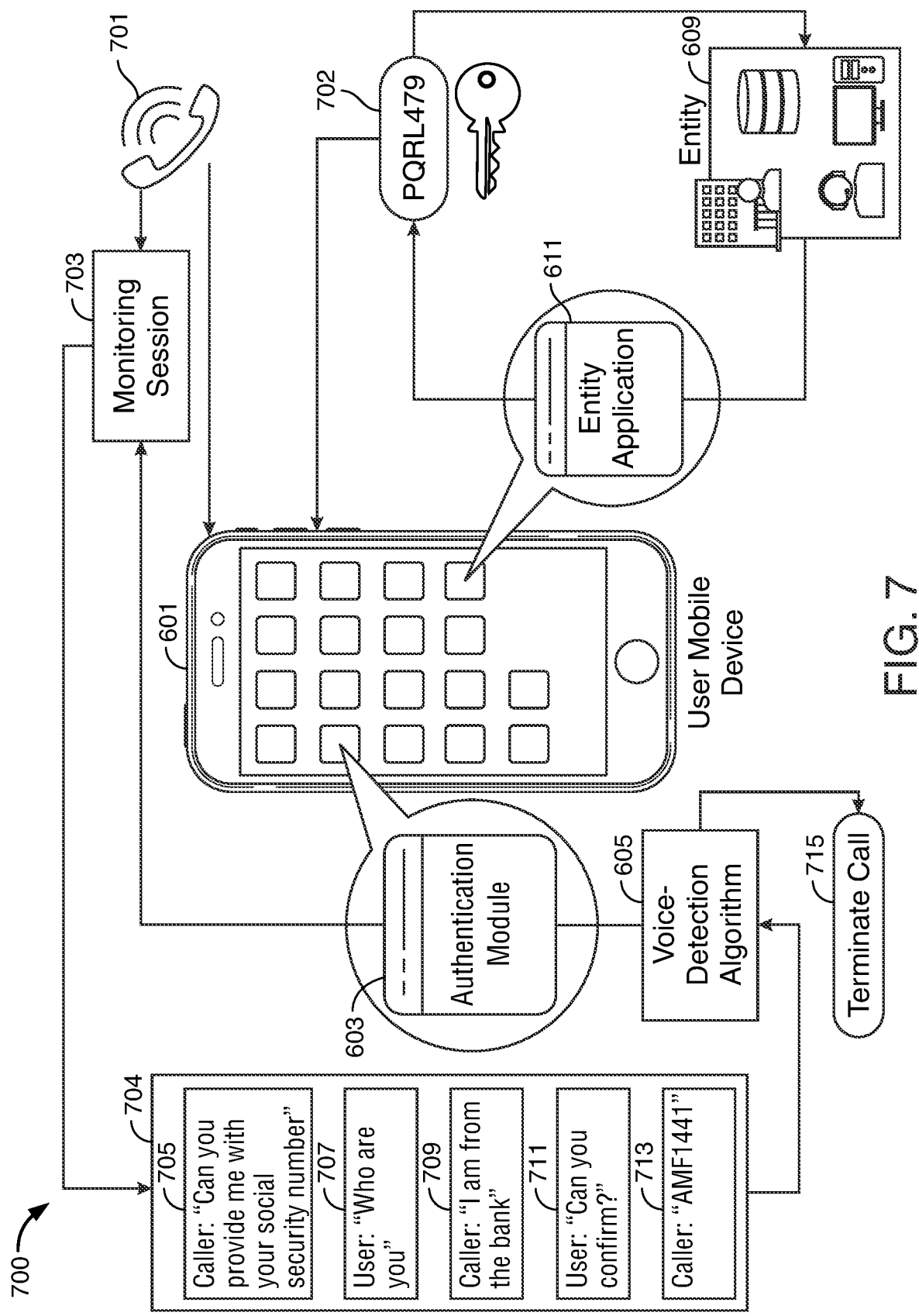
FIG. 7 shows yet another illustrative diagram in accordance with principles of the disclosure.

FIG. 7 shows illustrative process 700. Process 700 may include one or more features in common with process 600. Mobile user device 601 may receive a call from caller 701. In response to receiving a call from caller 701, voice-detection algorithm 605 may monitor the call. Voice-detection algorithm 605 may identify keywords within the call (not shown). Voice-detection algorithm 605 may identify keywords within the call indicating that caller 701 claims to be associated with entity 609. In response to identifying, in the call, keywords relating to entity 609, entity application 611 may be instantiated on mobile user device 601.

In response to an instantiation of entity application 611, entity application 611 may generate one-time token 702. One-time token 702 may include one or more of the features as described above relating to one-time tokens 332, 513 and 613. Entity application 611 may transmit one-time token 702 to entity 609 via the first connection. Concurrent to the transmission of one-time token 702, entity application 611 may display one-time token 702 on user device 601.

In response to transmitting and displaying of token 702, authentication module 603 may instantiate monitoring session 703. Monitoring session 703 may monitor conversation 704 included in the call between a user of mobile user device 601 and caller 701. Conversation 704 may include conversation parts 705, 707, 709, 711 and 713. The user may have a first voice. The first voice may be transmitted through a first voice input channel included in mobile user device 601. Caller 701 may have a second voice. The second voice may be different from the first voice. The second voice may be received from a second input voice channel included in mobile user device 601. Voice-detection algorithm 605 may detect the first voice belonging to the user and the second voice belonging to caller 701.

Voice-detection algorithm 605 may classify conversation parts 707 and 711 as being uttered by the user. Voice-detection algorithm 605 may classify conversation parts 707 and 711 as being uttered by the user in response to an identification of the first voice belonging to the user. Voice-detection algorithm 605 may classify conversation parts 705, 709 and 713 as being uttered from caller 701. Voice-detection algorithm 605 may classify conversation parts 705, 709 and 713 as being uttered from caller 701 in response to an identification of the second voice belonging to caller 701.

Voice-detection algorithm 605 may include NLP model (not shown). The NLP model may parse conversation 704 into groups of text utterances. The NLP model may compare the text utterances to one-time token 702. In response to identifying that no conversation parts correspond to one-time token 702 within a predetermined time period, authentication module 603 may transmit termination call notification 715 to mobile user device 601.

Figure 8:
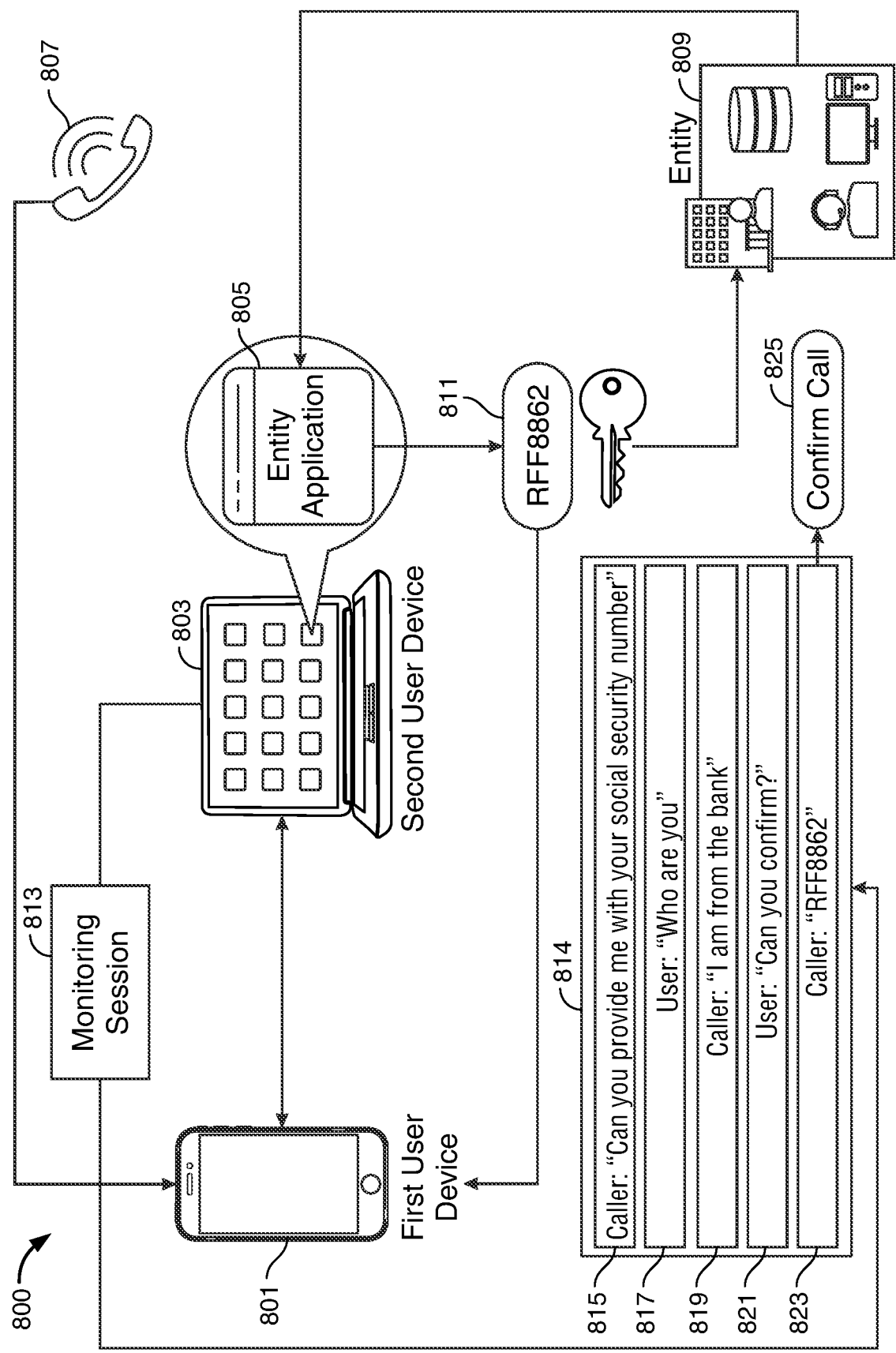
FIG. 8 shows yet another illustrative diagram in accordance with principles of the disclosure.

FIG. 8 shows illustrative process 800. Process 800 may include first user device 801. First user device 801 may be a landline phone, a cellular phone, a satellite phone or any other suitable telephone. Process 800 may include second user device 803. Second user device 803 may be a laptop, desktop, smartphone, PDA, tablet, mainframe computer, or any other suitable computing devices. First user device 801 may be electronically connected to second user device 803. The electronic connection may be a wireless connection. The electronic connection may be a wireless connection such as Bluetooth®, Wi-Fi®, Zigbee® or any other suitable wireless protocol. The electronic connection may be a wired connection. The wired connection may include connector. The wired connection may include wired connections such as a coaxial cable, a fiber optic cable, an ethernet cable, or any other suitable wired connector. The electronic connection may enable second user device 803 to monitor first user device 801.

First user device 801 may receive a call from caller 807. Caller 807 may identify as being associated with entity 809. In response to receiving the call from caller 807, second user device 803 may monitor first user device 801 through the electronic connection initiated by a user command.

In response to receiving the call from caller 807, second user device 803 may instantiate an instance of entity application 805. Entity application 805 may be an application being operated by entity 809. Entity application 805 may include a first connection. The first connection may connect entity application 805 to entity 809. Entity application 805 may include a second connection. The second connection may connect entity application 805 to second user device 803.

In response to an instantiation of entity application 805, entity application 805 may generate one-time token 811. One-time token 811 may include one or more of the features as described above relating to one-time token 332, 513, 613 and 702. Entity application 805 may transmit one-time token 811 to entity 809 via the first connection. Concurrent to the transmission of one-time token 811, entity application 805 may display one-time token 811 on second user device 803.

In response to transmitting and displaying of one-time token 811, second user device 803 may instantiate monitoring session 813. Monitoring session 813 may monitor conversation 814 included in the call between a user of first user device 801 and caller 807. Conversation 814 may include conversation parts 815, 817, 819, 821 and 823. The user may have a first voice. The first voice may be transmitted through a first voice input channel included in first user device 801. Caller 807 may have a second voice. The second voice may be different from the first voice. The second voice may be received from a second input voice channel included in first user device 801. Second user device 803 may include a voice detection algorithm. The voice-detection algorithm may detect the first voice belonging to the user and the second voice belonging to caller 807.

The voice-detection algorithm may classify conversation parts 817 and 821 as being uttered by the user. The voice-detection algorithm may classify conversation parts 817 and 821 as being uttered by the user in response to an identification of the first voice belonging to the user. The voice-detection algorithm may classify conversation parts 815, 819 and 823 as being uttered from caller 807. The voice-detection algorithm may classify conversation parts 815, 819 and 823 as being uttered from caller 807 in response to an identification of the second voice belonging to caller 807.

The voice-detection algorithm may include an NLP model. The NLP model may parse conversation 814 into groups of text utterances. The NLP model may compare the text utterances to one-time token 811. In response to identifying that conversation part 823 corresponds to one-time token 811 within a predetermined time period, second user device 803 may transmit confirm call notification 825 to first user device 801.

Figure 9:
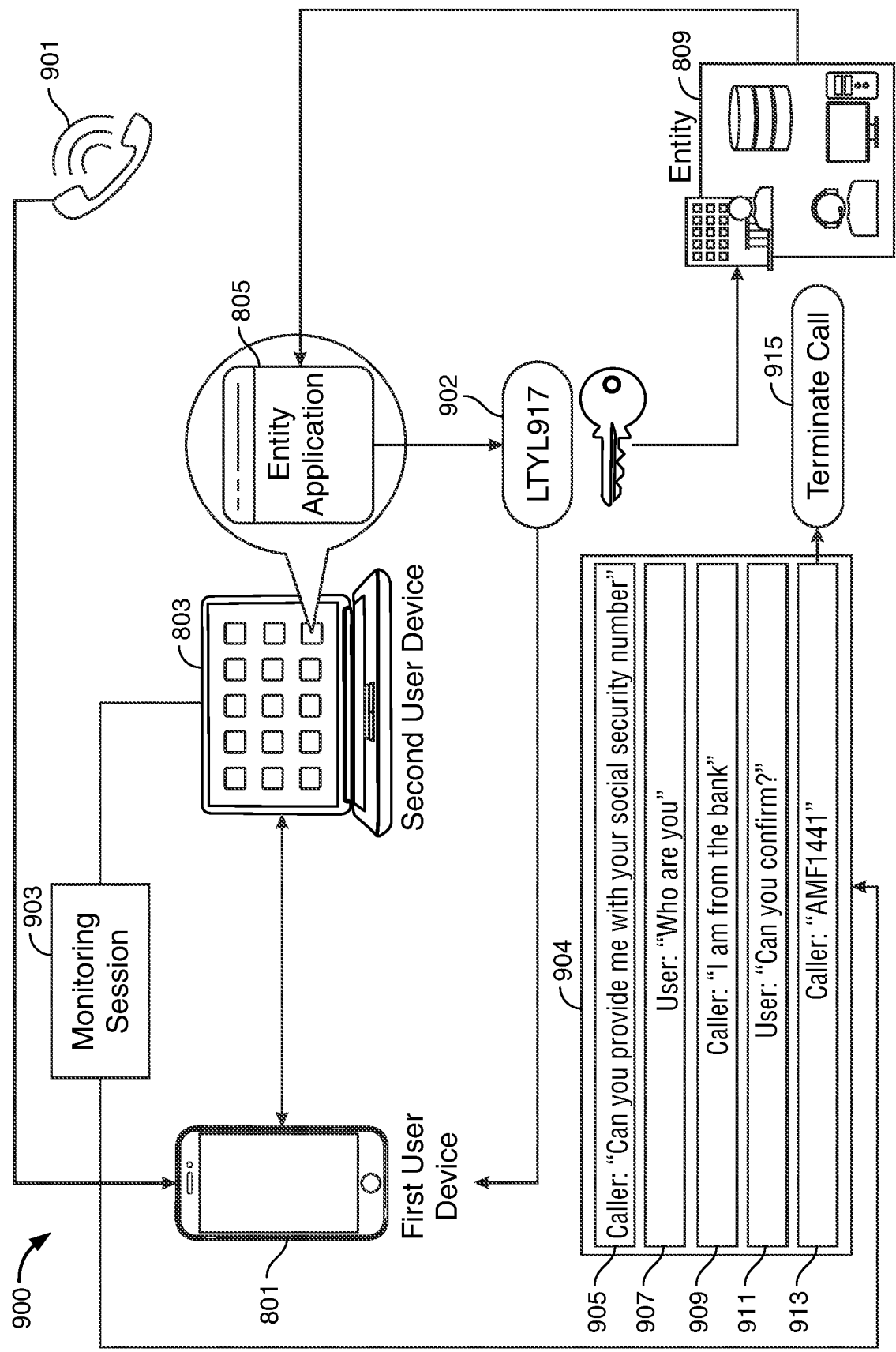
FIG. 9 shows still yet another illustrative diagram in accordance with principles of the disclosure.

FIG. 9 shows illustrative process 900. Process 900 may include on or more features in common with process 800. First user device 801 may receive a call from caller 901. In response to receiving the call from caller 901, second user device 801 may monitor first user device 801 through the electronic connection initiated through a user command.

In response to receiving the call from caller 901, second user device 803 may instantiate an instance of entity application 805. In response to an instantiation of entity application 805, entity application 805 may generate one-time token 902. One-time token 902 may include one or more of the features as described above relating to one-time tokens 332, 513, 613, 702 and 811. Entity application 805 may transmit one-time token 902 to entity 809 via the first connection. Concurrent to the transmission of one-time token 902, entity application 805 may display one-time token 902 on second user device 803.

In response to transmitting and displaying of token 902, second user device 803 may instantiate monitoring session 903. Monitoring session 903 may monitor conversation 904 included in the call between a user of first user device 801 and caller 901.

Conversation 904 may include conversation parts 905, 907, 909, 911 and 913. The user may have a first voice. The first voice may be transmitted through a first voice input channel included in first user device 801. Caller 901 may have a second voice. The second voice may be different from the first voice. The second voice may be received from a second input voice channel included in first user device 801. The voice-detection algorithm may detect the first voice belonging to the user and the second voice belonging to caller 901.

The voice-detection algorithm may classify conversation parts 907 and 911 as being uttered by the user. The voice-detection algorithm may classify conversation parts 907 and 911 as being uttered by the user in response to an identification of the first voice belonging to the user. The voice-detection algorithm may classify conversation parts 905, 909 and 913 as being uttered from caller 901. The voice-detection algorithm may classify conversation parts 905, 909 and 913 as being uttered from caller 901 in response to an identification of the second voice belonging to caller 901.

The NLP model may parse conversation 904 into groups of text utterances. The NLP model may compare the text utterances to one-time token 902. In response to identifying that no conversation parts correspond to one-time token 902 within a predetermined time period, second user device 803 may transmit termination call notification 915 to first user device 801.

Thus, methods and apparatus for USER INITIATED ENTITY VERIFICATION are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. Apparatus for detection and remediation of an identified attempt of impersonation of a digital entity, the apparatus comprising:
 a user telephone, the user telephone comprising:
  a transceiver, the transceiver configured to:
   receive telephone calls; and
   transmit telephone calls;
 a user device, the user device comprising:
  a processor, the processor configured to execute one or more applications, the one or more applications comprising an entity-operated web-based application, the entity-operated web-based application comprising:
a first connection, said first connection connecting the entity-operated web-based application to a plurality of entity networks;
a second connection, said second connection connecting the entity-operated web-based application to the user device, wherein:
the entity-operated web-based application is configured to:
be executable on the user device in response to an initiation by a user;
enable authentication of a telephone call received by the user telephone, the telephone call originating from an entity;
generate a one-time token in response to receiving a user command;
transmit the one-time token to the entity through the first connection;
simultaneous to the transmission of the one-time token from the entity-operated web-based application to the entity, display the one-time token on the user device via the second connection; and
start a predetermined time period from the transmission of the one-time token for the telephone call to be authenticatable as originating from the entity;

wherein:
when the entity-operated web-based application receives a verification indication from the user within the predetermined time period, the entity-operated web-based application is further configured to transmit an alert indication to the user device and/or user telephone that an operator operating the telephone call is verified; and
when the entity-operated web-based application fails to receive a verification indication from the user within the predetermined time period, the entity-operated web-based application is further configured to transmit an alert indication to the user device and/or user telephone that the telephone call is unsecure.

2. The apparatus of claim 1 wherein the telephone call received by the user telephone includes a corresponding phone number.

3. The apparatus of claim 2 wherein if the entity-operated web-based application cannot identify an entity-associated operator communicating with the user on the telephone call, the entity-operated web-based application is further configured to transmit a high-level alert to the user that the telephone call is malicious.

4. The apparatus of claim 1 wherein the one-time token is valid for a duration of the telephone call.

5. A method for detection and remediation of an identified attempt of impersonation of a digital entity, the method comprising:
executing an authentication module on a mobile user device, the authentication module configured to monitor calls received and transmitted by the mobile user device, the authentication module including a voice-detection algorithm;
receiving a call at the mobile user device; and
authenticating, using the authentication module, if the call originates from an predefined entity, the authenticating comprising instantiating an entity-operated web-based application on the mobile user device, the authenticating comprising:
detecting using the voice-detection algorithm, one or more keywords, included in the call, the one or more keywords indicating that the call is associated with the predefined entity;
in response to detecting that the call is associated with the predefined entity, using the entity-operated web-based application to:
generate a one-time token; and
transmit the one-time token to a database associated with the predefined entity;
verifying the call using the authentication module, the verifying comprising:
identifying, during the call, a first voice from a first voice input channel of the mobile user device and a second voice from a second voice input channel of the mobile user device, the second voice input channel being different from the first voice input channel;
processing words identified as being uttered by the second voice into groups of text utterances using a natural language processing ("NLP") model included in the voice-detection algorithm; and
detecting, during a predetermined time period starting immediately after the generation of the one-time token, if any text utterances from the groups of text utterances correspond to the one-time token.

6. The method of claim 5 the method further comprising:
in response to a detection of an utterance corresponding to the one-time token in the groups of text utterances during the predetermined time period:
verifying the call as originating from the predefined entity
enabling the call to continue;
tagging a phone number corresponding to the call as a verified phone number; and
storing the verified phone number at a memory location associated with the mobile user device.

7. The method of claim 5 the method further comprising:
in response to a failure to detect the one-time token in the groups of text utterances during the predetermined time period:
flagging the call as not originating from the predefined entity;
terminating the call;
tagging a phone number corresponding to the call as a unverified phone number; and
storing the unverified phone number at a memory location associated with the mobile user device.

8. The method of claim 5 wherein the first voice is a voice corresponding to a user of the mobile user device.

9. The method of claim 5 wherein the second voice is a voice corresponding to an operator of the call.

10. The method of claim 5 wherein the one-time token is valid for a duration of the call.

11. A method for detection and remediation of an identified attempt of impersonation of a digital entity, the method comprising:
receiving a call at a first user device;
authenticating that the call is originating from a predefined entity, the authenticating comprising instantiating an entity-operated web-based application on a second user device, wherein the entity-operated web-based application:

in response to receiving user credentials:
: initiates an electronic connection with the first user device, the electronic connection enabling the second user device to monitor the first user device; and
: generates a one-time token;

transmits the one-time token to a database relating to the predefined entity; and concurrent to generating the one-time token, activates a voice-detection algorithm to monitor the call through the electronic connection, the monitoring comprising:
: identifying, during the call, a first voice from a first voice input channel of the first user device and a second voice from a second voice input channel of the first user device, the second voice input channel being different from the first voice input channel;
: processing words identified as being uttered by the second voice into groups of text utterances using a natural language processing ("NLP") model included in the voice-detection algorithm; and
: detecting, during a predetermined time period starting immediately after the generation of the one-time token, if any text utterances from the groups of text utterances correspond to the one-time token.

12. The method of claim 11 the method further comprising:
: in response to a detection of the one-time token in the groups of text utterances during the predetermined time period, verifying the call as originating from the predefined entity, said verifying comprising:
:: enabling the call to continue;
:: tagging a phone number corresponding to the call as a verified phone number; and
:: storing the verified phone number at a memory location associated with the first user device.

13. The method of claim 11 the method further comprising:
: in response to a failure to detect the one-time token in the groups of text utterances during the predetermined time period:
:: flagging the call as not originating from the predefined entity;
:: terminating the call;
:: tagging a phone number corresponding to the call as an unverified phone number; and
:: storing the unverified phone number, at a memory location associated with the first user device.

14. The method of claim 11 wherein the first voice is a voice corresponding to a user of the first and second user devices.

15. The method of claim 11 wherein the second voice is a voice corresponding to an operator of the call.

16. The method of claim 11 wherein the one-time token is valid for a duration of the call.

17. The method of claim 11 wherein the electronic connection between the first and second user devices is a wireless connection.

18. The method of claim 11 wherein the electronic connection between the first and second user devices is a wired connection.

* * * * *